(12) United States Patent
Oppenländer et al.

(10) Patent No.: US 6,533,830 B1
(45) Date of Patent: Mar. 18, 2003

(54) POLYALKENE ALCOHOL-POLYALKOXYLATES AND THEIR USE IN FUELS AND LUBRICANTS

(75) Inventors: Knut Oppenländer, Ludwigshafen (DE); Wolfgang Günther, Mettenheim (DE); Hans Peter Rath, Grünstadt (DE); Irene Trötsch-Schaller, Bissersheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/926,046

(22) PCT Filed: Feb. 10, 2000

(86) PCT No.: PCT/EP00/01071

§ 371 (c)(1),
(2), (4) Date: Aug. 21, 2001

(87) PCT Pub. No.: WO00/50543

PCT Pub. Date: Aug. 31, 2000

(30) Foreign Application Priority Data

Feb. 25, 1999 (DE) .......................... 199 08 262

(51) Int. Cl.⁷ ................................ C10L 1/18
(52) U.S. Cl. .......................... 44/443; 44/447; 568/606; 568/618; 568/840
(58) Field of Search .................. 44/443, 447; 568/606, 568/618, 840

(56) References Cited

U.S. PATENT DOCUMENTS

| 4,832,702 A | * | 5/1989 | Kummer ..................... 44/412 |
| 4,859,210 A | | 8/1989 | Franz et al. |
| 4,877,416 A | | 10/1989 | Campbell |

FOREIGN PATENT DOCUMENTS

| EP | 0 277 345 | 8/1988 |
| GB | 1 097 696 | 1/1968 |
| WO | WO 00/02978 | 1/2000 |

* cited by examiner

*Primary Examiner*—Cephia D. Toomer
(74) *Attorney, Agent, or Firm*—Oblon, Spivak, McClelland, Maier & Neustadt, P.C.

(57) ABSTRACT

Polyalkene alcohol polyalkoxylates $R-(CH_2)_n-(O-A)_m-OH$, where R is a polyalkene radical derived from $C_2$- to $C_{30}$-alkenes and having a number average molecular weight from 300 to 5000, A is an alkylene group of 2 to 8 carbon atoms, m is a number up to 200, with the proviso that the oxygen in the oxyalkylate radical accounts for at least 16.5% by weight of the number average molecular weight of the total molecule I, and n is 0 or 1, are suitable as carrier oils in fuel and lubricant compositions.

12 Claims, No Drawings

POLYALKENE ALCOHOL-POLYALKOXYLATES AND THEIR USE IN FUELS AND LUBRICANTS

This application is a 371 of PCT/EP00/01071, filed Feb. 10, 2000.

The present invention relates to special polyalkene alcohol polyalkoxylates, their use as carrier oils for detergents and dispersants in fuel and lubricant compositions and fuel and lubricant additive concentrates and fuel and lubricant compositions themselves which contain these polyalkene alcohol polyalkoxylates.

Carburetors and intake systems of gasoline engines as well as injection systems for fuel metering are increasingly being contaminated by dust particles from the air, uncombusted hydrocarbon residues from the combustion chamber and the crank case vent gases passed into the carburetor.

To avoid these disadvantages, additives (detergents) are added to the fuel to keep valves and carburetor or injection systems clean. Such detergents are generally used in combination with one or more carrier oils. The carrier oils perform an additional wash function, often support and promote the detergents in their cleaning and keeping clean effect and can thus help to reduce the amount of detergents required. The carrier oils usually used are viscous, high-boiling and in particular heat-stable liquids. They coat the hot metal surfaces, for example the intake valves, with a thin liquid film and thus prevent or delay the formation and deposition of decomposition products on the metal surfaces.

Frequently used carrier oils are, for example, high-boiling refined mineral oil fractions, but also synthetic liquids, such as oil-soluble adducts of alkylene oxides with alcohols. EP-A 277 345 describes adducts of ethylene oxide, propylene oxide and/or butylene oxide with polybutyl or polyisobutene alcohols as carrier oils in fuel or lubricant compositions, it being possible for from 1 to 200 such alkylene oxide units to undergo addition per mole of alcohol, but the molecular weight of the polyisobutene should not be exceeded.

However, the carrier oils known from the prior art frequently have only limited compatibility with other additives, so that separation may occur. Furthermore, the generally high viscosity of these carrier oils often gives rise to formulation problems. In particular, they are not yet capable of completely eliminating the undesired effect of "sticking of the valves". "Sticking of the valves" is understood as meaning complete loss of compression on one or more cylinders of the internal combustion engine if—owing to polymer deposits on the valve shaft—the spring force is no longer sufficient to close the valves properly.

It is an object of the present invention to provide carrier oils for detergents and dispersants in fuel and lubricant compositions, which carrier oils no longer have the prior art problems described. In particular, these carrier oils should as far as possible be additionally effective as detergents.

We have found that this object is achieved by polyalkene alcohol polyalkoxylates of the formula I

                                (I)

where

R is a polyalkene radical derived from $C_2$- to $C_{30}$-alkenes and having a number average molecular weight of from 300 to 5000, A is an alkylene group of 2 to 8 carbon atoms, m is a number up to 200, with the proviso that the oxygen in the oxyalkylate radical —A—(O—A)$_{m-1}$—OH accounts for at least 16.5% by weight of the number average molecular weight of the total molecule of the compounds I, and n is 0 or 1.

Suitable radicals R are straight-chain or branched hydrocarbon groups which are derived from $C_2$- to $C_{30}$-alkenes, in particular from $C_3$- to $C_{12}$-alkenes, especially from $C_3$- to $C_6$-alkenes. Examples of typical alkenes are ethene, propene, butenes, pentenes, hexenes, heptenes, octenes, nonenes, decenes, undecenes and dodecenes. Of particular interest are propene, n-butene and isobutene. The polyalkene on which the hydrocarbon radical R is based is obtainable by oligomerization or polymerization of these alkenes, the oligomerization or polymerization being carried out as a rule (for example by cationic or coordinate oligomerization or polymerization) so that the chain termination leads to a double bond which can be further functionalized to give the corresponding polyalkene alcohol.

R is preferably a polybutyl or polyisobutyl radical derived from isobutene and up to 20% by weight of n-butene and having a number average molecular weight ($M_N$) of from 300 to 2500. R is particularly preferably a polybutyl or polyisobutyl radical having a number average molecular weight of from 350 to 1500, in particular from 400 to 850, especially from 450 to 700. Preferably, R is also composed solely of isobutene units.

R may preferably be based on highly reactive polyisobutene (having double bonds predominantly in the a position) which—as described in EP-A 277 345—can be converted into the corresponding alcohol R—CH$_2$—OH (n=1) by hydroformylation. When n=0 the preparation of corresponding polybutene or polyisobutene alcohols is usually carried out starting from polybutenes or polyisobutenes having double bonds which are predominantly further inside the polymer chain (for example in the β or γ position); these are then usually converted into the poly(iso)butene alcohols either by ozonolysis and subsequent reduction or by epoxidation and subsequent reduction or by hydroboration and subsequent hydrolysis or by halogenation with chlorine or bromine and subsequent alkaline hydrolysis.

The alkylene group A is preferably derived from corresponding alkylene oxides, such as ethylene oxide, propylene oxide, 1,2-butylene oxide and cis- or trans-2,3-butylene oxide. However, it may also be 1,3-propylene, 1,4-butylene, 1,6-hexylene or 1,8-octylene. A may also be a mixture of different groups from among the stated groups. A is particularly preferably a 1,2-propylene group, a 1,2-butylene group or a mixture thereof.

The lower limit for the degree of alkoxylation m is determined by the proviso that the oxygen in the oxyalkylate radical —A—(O—A)$_{m-1}$—OH accounts for at least 16.5% by weight of the number average molecular weight of the compounds I. The preferred upper limit m depends on the molar mass of this polyalkene alcohol. Typically, however, this upper limit is 100, in particular 45, especially 35, alkylene oxide units.

The number m may be an integer where only a single type of molecules of the compound I is present, or a fraction where a mixture of different (usually homologous) types of molecules of I is present.

The oxygen in the oxyalkylate radical —A—(O—A)$_{m-1}$—OH preferably accounts for at least 17.5% by weight, especially 18.5% by weight of the number average molecular weight of the total molecule of the compounds I.

In a preferred embodiment, the molar mass of the oxyalkylate radical —A—(O—A)$_{m-1}$—OH is greater than the molar mass of the parent polyalkene alcohol R—(CH$_2$)$_n$—

OH. The molar mass of the oxyalkylate radical —A—(O—A)$_{m-1}$—OH is in particular from 1.5 to 5 times, especially from 2 to 4 times, the molar mass of the parent polyalkene alcohol R—(CH$_2$)$_n$—OH. The molar mass calculations relate to the number average molecular weights.

The novel polyalkene alcohol polyalkoxylates I can be prepared by conventional methods, for example by reacting the parent polyalkene alcohols R—(CH$_2$)$_n$—OH with the corresponding amount of alkylene oxide in the presence of suitable catalysts, such as potassium hydroxide preferably in an amount of from 0.01 to 1% by weight, particularly from 0.05 to 0.5% by weight of potassium hydroxide, based on the amount of the reaction product expected. Typical reaction temperatures are from 70 to 200° C., in particular from 100 to 160° C. The pressure is usually from 3 to 30 bar. The reaction product is worked up in the usual manner by expelling volatile components under reduced pressure and, if required, by filtration.

The novel polyalkene alcohol polyalkoxylates I are very suitable as carrier oils for detergents and dispersants in fuel and lubricant compositions. They are particularly preferably used in fuel compositions, in particular in gasoline fuel compositions.

Examples of conventional detergents are:

(a) polyisobuteneamines which are obtainable, according to EP-A 244 616, by hydroformylation of highly reactive polyisobutene and subsequent reductive amination with ammonia, monoamines or polyamines, such as dimethyleneaminopropylamine, ethylenediamine, diethylenetriamine, triethylenetetramine or tetraethylenepentamine, (b) poly(iso)buteneamines which are obtainable by chlorination of polybutenes or polyisobutenes having double bonds predominantly in the β and γ position and subsequent amination with ammonia, monoamines or the abovementioned polyamines, (c) poly(iso)buteneamines which are obtainable by oxidation of double bonds in poly(iso)butenes with air or ozone to give carbonyl or carboxyl compounds and subsequent amination under reducing (hydrogenating) conditions, (d) polyisobuteneamines which are obtainable, according to DE-A 196 20 262, from polyisobutene epoxides by reaction with amines and subsequent dehydration and reduction of the aminoalcohols, (e) if required, hydroxyl-containing polyisobuteneamines which are obtainable, according to WO-A 97/03946, by reaction of polyisobutenes having an average degree of polymerization P of from 5 to 100 with nitrogen oxides or mixtures of nitrogen oxides and oxygen and subsequent hydrogenation of these reaction products, (f) hydroxyl-containing polyisobuteneamines which are obtainable, according to EP-A 476 485, by reaction of polyisobutene epoxides with ammonia, monoamines or the abovementioned polyamines, (g) polyetheramines which are obtainable by reaction of C$_2$- to C$_{30}$-alkanols, C$_6$- to C$_{30}$-alkanediols, mono- or di-C$_2$- to C$_{30}$-alkylamines, C$_1$- to C$_{30}$-alkylcyclohexanols or C$_1$- to C$_{30}$-alkylphenols with from 1 to 30 mol of ethylene oxide and/or propylene oxide and/or butylene oxide per hydroxyl or amino group and subsequent reductive amination with ammonia, monoamines or the abovementioned polyamines, it also being possible to use polyetheramines having a carbamate structure, (h) "polyisobutene Mannich bases" which are obtainable, according to EP-A 831 141, by reaction of polyisobutene-substituted phenols with aldehydes and monoamines or the abovementioned polyamines.

Conventional dispersants are, for example, imides, amides, esters and ammonium and alkali metal salts of polyisobutenesuccinic anhydrides, which are used in particular in lubricating oils, but some of which are also used as detergents in fuel compositions.

Further gasoline fuel additives which may be used, together with the compounds I, are those which inhibit the wear of valve seats; of interest here are, for example, additives containing carboxyl groups or their alkali metal or alkaline earth metal salts, for example copolymers of C$_2$–C$_{40}$-olefins with maleic anhydride, having a total molar mass of from 500 to 20,000, some or all of whose carboxyl groups have been converted into the alkali metal or alkaline earth metal salts and the remainder of the carboxyl groups having reacted with alcohols or amines, as described in EP-A 307 815, or additives containing sulfo groups or their alkali metal or alkaline earth metal salts, for example alkali metal or alkaline earth metal salts of alkyl sulfosuccinates, as described in EP-A 639 632. Said gasoline fuel additives which inhibit the wear of valve seats can advantageously also be used in combination with conventional fuel detergents, such as poly(iso)buteneamines or polyetheramines, as described in WO-A 87/01126.

The present invention also relates to fuel and lubricant additive concentrates which contain the novel polyalkene alcohol polyalkoxylates I in amounts of from 0.1 to 80, in particular from 0.5 to 60% by weight, based on the total amount of the concentrates. These concentrates usually also contain the abovementioned detergents or dispersants and further components and assistants usual for this purpose as well as solvents or diluents, for example aliphatic and aromatic hydrocarbons, such as Solvent Naphtha.

Further conventional components and assistants are corrosion inhibitors, for example based on film-forming ammonium salts of organic carboxylic acids or on heterocyclic aromatics in the case of inhibition of corrosion of nonferrous metals, antioxidants or stabilizers, for example based on amines such as p-phenylenediamine, dicyclohexylamine or derivatives thereof, or on phenols, such as 2,4-di-tert-butylphenol or 3,5-di-tert-butyl-4-hydroxyphenylpropionic acid, demulsifiers, antistatic agents, metallocenes, such as ferrocene or methylcyclopentadienylmanganese tricarbonyl, lubricity additives, such as specific fatty acids, alkenylsuccinic esters, bis(hydroxyalkyl) fatty amines, hydroxyacetamides or castor oil, and markers. Sometimes amines, too, are added to lower the pH of the fuel.

Further conventional carrier oils should also be mentioned as further customary components and additives, for example mineral carrier oils (base oils), in particular those of the viscosity class Solvent Neutral (SN) 500 to 2000, and synthetic carrier oils based on olefin polymers having M$_N$=from 400 to 1800, especially those based on polybutene or polyisobutene (hydrogenated or nonhydrogenated) or on polyalphaolefins or poly(internal olefins).

The present invention furthermore relates to fuel and lubricant compositions, in particular fuel compositions, especially gasoline fuel compositions, which contain the novel polyalkene alcohol polyalkoxylates I in effective amounts. As a rule, effective amounts are to be understood as meaning from 10 to 5000, in particular from 50 to 2000, ppm by weight in the case of fuel compositions and from 0.1 to 10, in particular from 0.5 to 5, % by weight in the case of lubricant compositions, based in each case on the total amount of the composition. In addition to the novel compounds I as carrier oils, the fuel and lubricant compositions usually contain the abovementioned detergents and dispersants as well as the stated further components and assistants customary for this purpose and solvents or diluents.

Furthermore, combinations of a gasoline fuel with a mixture of polyalkene alcohol polyalkoxylates I, polyisobuteneamine detergents, in particular those of the abovementioned groups (a), (b), (c) or (d), and corrosion inhibitors and/or lubricity additives based on carboxylic acids or fatty acids, which may be present as monomeric and/or dimeric species, are particularly suitable for the novel fuel compositions.

The novel polyalkene alcohol polyalkoxylates I are capable of effectively avoiding the undesired "sticking of the valves", in particular in gasoline engines. As a rule, they are also adequately compatible with the other additives so that no separation effects occur. Moreover, their viscosity behavior does not give rise to any formulation problems.

The compounds I can be used primarily as carrier oils and are also effective as detergents. Even when metered in small amounts, they therefore make a large contribution to the overall performance of an additive packet with respect to the detergent effect and therefore permit a saving of at least a part of the conventional more expensive detergents.

EXAMPLES

Preparation of Adducts of Propylene Oxide or 1,2-butylene Oxide With Polyisobutene Alcohol ($M_N$=550)

A polyisobutene alcohol prepared according to EP-A 277 345 from highly reactive polyisobutene by hydroformylation and having a number average molecular weight $M_N$ of 550 was reacted under conventional reaction conditions (potassium hydroxide catalysis, 135° C. reaction temperature) with x mol of propylene oxide (PO) or 1,2-butylene oxide (BO) to give the adducts characterized in the Table below.

Testing of Performance Characteristics

Tests on the cleanliness of intake valves were carried out in a Mercedes Benz M 102 E engine according to the CEC method F-05-A-93. Furthermore, valve sticking tests (no harm tests) were carried out in a VW Wasserboxer engine according to the CEC method F-16-T-96, at three times the dose required for keeping intake valves clean. A commercial premium-grade European base fuel according to EN 228 was used for the engine tests. The gasoline fuel additive concentrates tested here comprise additive packets which contain, as detergent, 60% by weight of a conventional polyisobuteneamine according to EP-A 244 616 and 20% by weight of the above adducts of PO or BO with polyisobutene alcohol ($M_N$=550). The dose for the concentrates was in each case 600 mg/kg in the tests for intake valve cleanliness and in each case 1800 mg/kg in the valve sticking tests.

TABLE

| Example No. | Amount x of alkoxylene oxide | Molar mass of oxyalkylate radical | Ratio of molar mass of oxyalkylate radical to that of alcohol | Oxygen fraction of the oxyalkylate radical |
| --- | --- | --- | --- | --- |
| 1 according to the invention | 25 mol PO | 1450 | 2.6:1 | 20.0% by weight |
| 2 according to the invention | 20 mol PO | 1160 | 2.1:1 | 18.7% by weight |
| 3 for comparison | 10 mol PO | 580 | 1.05:1 | 14.2% by weight |
| 4 for comparison | 10 mol BO | 720 | 1.3:1 | 12.6% by weight |
| 5 for comparison | 20 mol BO | 1440 | 2.6:1 | 16.1% by weight |

| Example No. | Intake valve deposits [mg/valve] | | | | mean value | Valve sticking test |
| --- | --- | --- | --- | --- | --- | --- |
| | 1 | 2 | 3 | 4 | | |
| no additives | 283 | 132 | 232 | 290 | 234 | — |
| 1 according to the invention | 0 | 19 | 7 | 45 | 15 | passed |
| 2 according to the invention | — | — | — | — | — | passed |
| 3 for comparison | 3 | 20 | 18 | 3 | 11 | not passed |
| 4 for comparison | 1 | 4 | 12 | 14 | 8 | not passed |
| 5 for comparison | 2 | 22 | 0 | 24 | 15 | not passed |

As evident from the above Table, all additive packets tested had a comparably good detergent effect but only the novel additive packets 1 and 2 are capable of effectively avoiding sticking of the valves in the VW Wasserboxer engine.

What is claimed is:

1. A polyalkene alcohol polyalkoxylate of formula I $$R\text{—}(CH_2)_n\text{—}(O\text{—}A)_m\text{—}OH \qquad (I)$$

where

R is a polybutyl or polyisobutyl radical derived from isobutene and up to 20% by weight of n-butene and having a number average molecular weight of from 400 to 850, A is 1,2-propylene and/or 1,2-butylene, m is a number up to 45, with the proviso that the oxygen in the oxyalkylate radical $(OA)_m$ accounts for at least 16.5% by weight of the number average molecular weight of the total molecule of compound I, and n is 0 or 1.

2. The polyalkene alcohol polyalkoxylate as claimed in claim 1, in which the molar mass of the oxyalkylate radical $(OA)_m$ is greater than the molar mass of the polyalkene alcohol R—$(CH_2)_n$—OH used to form said polyalkene alcohol polyalkoxylate.

3. The polyalkene alcohol polyalkoxylate as claimed in claim 1, in which the molar mass of the oxyalkylate radical $(OA)_m$ is 1.5 to 5 times the molar mass of the polyalkene alcohol R—$(CH_2)_n$—OH used to form said polyalkene alcohol polyalkoxylate.

4. A process for the preparation of a polyalkene alcohol polyalkoxylate as claimed in claim 1, wherein polyalkene alcohols of the formula R—$(CH_2)_n$—OH, where R and n have the abovementioned meaning, are reacted with an effective amount of alkylene oxide in the presence of suitable catalysts.

5. The process for the preparation of a polyalkene alcohol polyalkoxylate as claimed in claim 4, wherein the reaction is carried out in the presence of from 0.01 to 1% by weight, based on the amount of the expected reaction product, of potassium hydroxide at from 70 to 200° C. and from 3 to 30 bar.

6. Carrier oil for detergents and dispersants in motor fuel and lubricating oil comprising a polyalkene alcohol polyalkoxylate as claimed in claim 1.

7. A fuel additive concentrate or lubricant additive concentrate comprising a polyalkene alcohol polyalkoxylate as claimed in claim 1 in an amount of from 0.1 to 80% by weight.

8. A motor fuel or lubricating oil comprising a polyalkene alcohol polyalkoxylate as claimed in claim 1 in an effective amount.

9. The polyalkene alcohol polyalkoxylate as claimed in claim 1, wherein said number average molecular weight is from 450 to 700 and m is a number up to 35.

10. The process for the preparation of a polyalkene alcohol polyalkoxylate as claimed in claim 4, wherein the reaction is carried out in the presence of from 0.05 to 0.5% by weight, based on the amount of the expected reaction product, of potassium hydroxide at from 100 to 160° C. and from 3 to 30 bar.

11. A motor fuel comprising a polyalkene alcohol polyalkoxylate as claimed in claim 1 in an amount of from 10 to 5000 ppm.

12. A lubricating oil comprising a polyalkene alcohol polyalkoxylate as claimed in claim 1 in an amount of from 0.1 to 10% by weight based on the total weight of said lubricating oil.

* * * * *